Nov. 21, 1944. W. F. MOORE 2,363,077
WORK GAUGE
Filed May 27, 1943 3 Sheets-Sheet 2
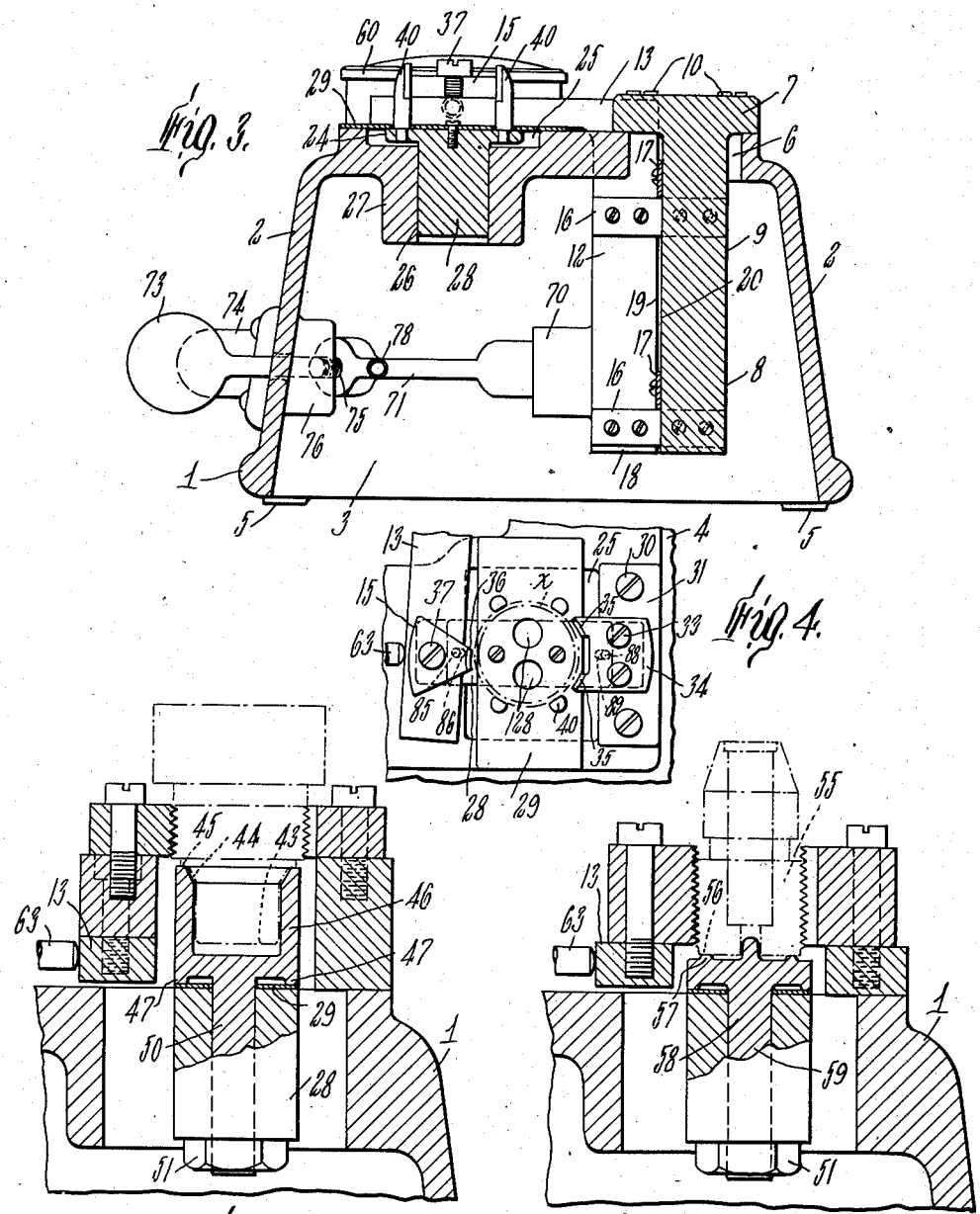
Inventor
Willis F. Moore
Wright Brown Quinby & May
Attys.

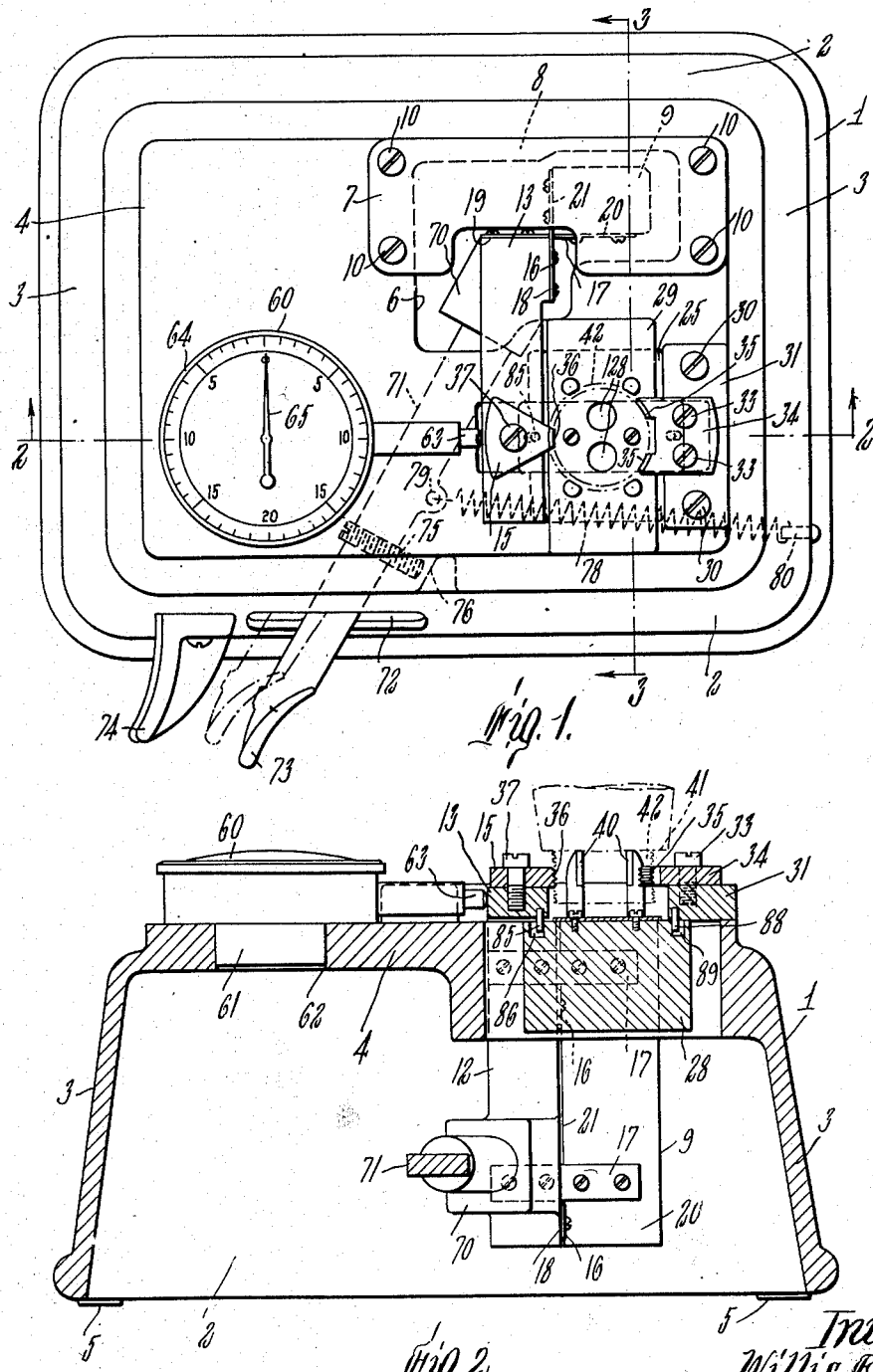

Nov. 21, 1944.　　　W. F. MOORE　　　2,363,077
WORK GAUGE
Filed May 27, 1943　　　3 Sheets-Sheet 3

Inventor
Willis F. Moore

Patented Nov. 21, 1944

2,363,077

UNITED STATES PATENT OFFICE 2,363,077

WORK GAUGE

Willis F. Moore, Springfield, Vt., assignor to Bryant Chucking Grinder Company, Springfield, Vt., a corporation of Vermont Application May 27, 1943, Serial No. 488,722

20 Claims. (Cl. 33—199)

This invention relates to mechanism for gauging work pieces, and particularly circumferentially grooved work pieces. Such work pieces may have annular or thread grooves which may be either external or internal. It has for an object to provide such a gauge by which the work pieces may be gauged rapidly and accurately to determine whether or not they are within selected tolerance limits. As applied to gauges for circumferentially grooved work, such determination includes not only diameters, but roundness, and as applied to the gauging of threaded work it may also include lead.

A further object is to produce such a gauge wherein the work engaging anvils are subjected to very little wear in use, so that they may have long effective life.

Still another object is to produce a gauge wherein the work piece is freed from the gauging anvils when the gauge is opened after a gauging action.

A still further object is to so support the work pieces to be gauged that the gauging anvils correctly engage the work threads when the gauge closes.

A further object is to so form the gauge that the anvils may be quickly and accurately related with their gauging elements conforming to the threads or grooves of an accurate master threaded or grooved member in gauging relation thereto.

Still another object is to provide a construction affording an easy and accurate centering of the anvils with relation to the master gauge member.

A further object is to produce a gauge easily adaptable for gauging either externally or internally threaded work.

Still another object is to provide work holders for special work pieces provided with locating surfaces, the work holders having parts with which the locating surfaces on the work pieces may be engaged, thus providing for rapidly and easily placing the work pieces in gauging position.

Further objects and advantages will appear from a description of certain embodiments of the invention shown in the accompanying drawings in which Figure 1 is a top plan view of an external thread gauge embodying the invention, the anvils being shown in closed or gauging position.

Figures 2 and 3 are vertical sectional views on lines 2—2 and 3—3, respectively, of Figure 1.

Figure 4 is a fragmentary view similar to a portion of Figure 1, but showing the gauge open.

Figures 5 and 6 are fragmentary views somewhat similar to a portion of Figure 2, but showing modified constructions.

Figure 7:
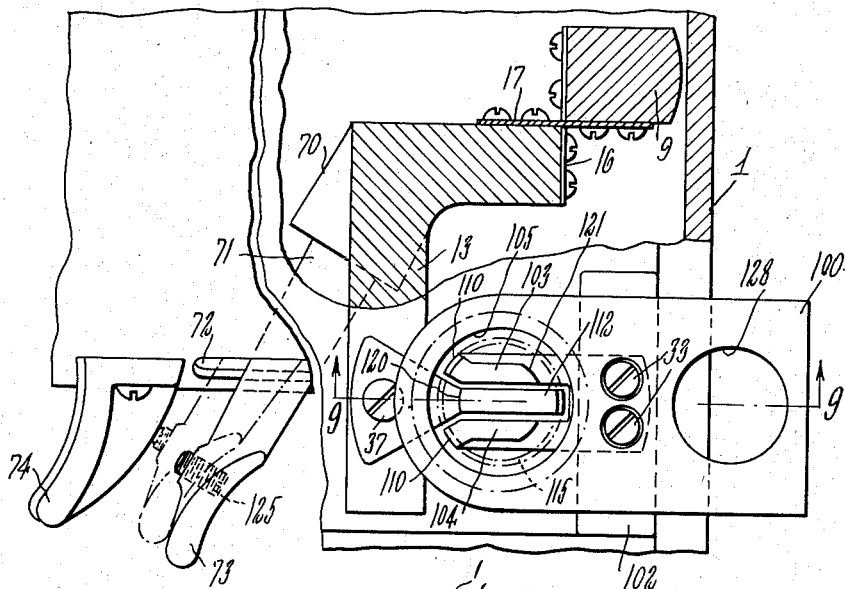
Figure 7 is a fragmentary view somewhat similar to a portion of Figure 1, but with parts broken away and in section, and showing a gauge for internal threads, the gauge being closed.

Referring first to the construction shown in Figures 1 to 4, inclusive, at 1 is indicated a stand having upwardly and inwardly inclined side and end wall members 2 and 3 joined by a top member 4, the stand being generally rectangular in outline and preferably provided at its base with supporting feet or pads 5. The top face 4 is provided with an aperture 6 therethrough toward its rear right hand end which is partly bridged by a head 7 of a bracket 8 having a depending shank 9 substantially rectangular in cross section. The head 7 extends beyond the aperture 6 at the back and on opposite sides and may be secured to the top face of the stand as by the screws 10. The shank 9 forms a support for a shank 12, also of substantially rectangular cross section, of a gauging lever 13 which projects over the top face of the stand and carries near its outer end a gauging anvil 15. The shanks 9 and 12 are pivotally connected together as by a pair of reed pivots, each comprising a pair of leaf springs 16 and 17 arranged at substantially right angles to each other and secured to angularly related side faces 18 and 19 of the shank 12 and 20 and 21 of the shank 9. These pairs of reed pivots are spaced well apart, thus to provide a firm support for the lever 13 which will not permit its free end to sag during use.

Forwardly of the aperture 6, the top wall 4 of the stand is provided with a substantially rectangular depression or socket 25 provided with a centrally arranged slot 26 which extends through the top wall of the stand and through a thickened portion 27 thereof, this slot providing a guideway for the reception of a stem 28. This stem 28 may be provided with a laterally extending head 24 at its upper end which rides freely in the socket 25. The stem 28 is secured to the lower face of a leaf spring 29 which is of a length sufficient to overlap the front and rear edges of the socket 25 and to ride on the top face of the stand top 4. The stem 28 is guided for lateral sliding motion, but is held against forward and rearward motion, in the direction of the overlap of the spring 29 beyond the front and rear edges of the socket 25. On the right hand side of the socket 25 there is secured to the top face of the stand, as by screws 30, a supporting block 31 and after the supporting block and the bracket 9 with the lever 13 pivotally connected thereto, have been assembled, the top face of the block 31 and the top face of the lever 13 are ground to an accurate plane surface. The supporting block 31 has fixed to its top face, as by a pair of screws 33, a gauging anvil 34 which is provided with a pair of spaced work-engaging elements 35. These work-engaging portions 35 and the single work-engaging portion 36 of the anvil 15, have portions of threads cut therein originally cut from a single internally threaded member so that their thread portions form parts of the same threads of the original piece, the end face of which is carefully brought into a single plane. By first bringing the top face of the lever 13 and the top face of the block 31 into a common plane as by a grinding operation, the correct relative axial positioning of the thread points of the two anvils when they are brought into gauging relation to a master threaded work piece is insured. Further, in order to facilitate the proper relation between these anvils, the stationary anvil 34 is fixed in position and the movable anvil 15 is mounted on a single screw 37 substantially parallel to the axis of the work on which it may pivot sufficiently to insure proper relation to the master work piece when the gauge is being set up, and when this has been accomplished the screw 37 may be tightened to fix the anvil 15 firmly to the lever 13.

The work piece to be gauged is supported by the leaf spring 29 which may flex sufficiently so that no matter in what angular relation the work piece is presented, the threads thereof may be brought into mating relation with the threads of the gauging element by any necessary axial motion of the work piece, such axial motion being permitted by the slight flexing of the leaf spring. The upper face of this leaf spring is ground flat when the work piece is to be directly supported thereon.

In many cases, however, a work piece may be provided with surfaces having some definite relation to the threads formed thereon, and these surfaces may be used as locating surfaces, and the leaf spring may be provided with a work holding block having parts with which such surfaces may engage. For example, as shown in Figures 1 and 2, the leaf spring may be provided with upstanding supports 40 upon which may be supported an annular shoulder 41 of the work piece above the location of the threaded portion 42, the threads of which it is desired to gauge. In Figure 5 the work piece is shown as provided with a reduced diameter end portion 43 above which is a tapered portion 44 and an annular shoulder 45. These may form locating surfaces for engagement with corresponding faces of a work holder 46 which may have an annular rib 47 supported on the spring 29 and a central shank 50 which extends down through the stem 28 and is secured in position therein as by a nut 51 threaded on its lower extremity.

In Figure 6 the work piece to be gauged at 55 is provided with an annular locating face 56 which is shown as supported on an annular rib 57 of the holder 58. This holder 58 also is provided with a shank 59 extending through a hole in the stem 28 and is secured in position as by a nut 51 threaded on its lower end.

The position of the movable anvil when in gauging relation to the work may be indicated as by a standard position indicator 60, a locating boss 61 on its back being fitted into a socket or hole 62 in the top face of the stand. The stem 63 of the position indicator is arranged to bear against the outer face of the lever 13. As is usual with this type of indicator, the indicator dial 64 may be rotated so as to bring the dial zero point under the indicator needle 65 when the lever 13 is in its angular position wherein the anvils properly cooperate with the threads of a standard work piece positioned between the anvils and supported by the spring 29.

Means are provided for facilitating the opening and closing of the gauge for reception or removal of a work piece. To this end, the lever shank 12 is shown as provided near its lower end with an outstanding boss 70 for the reception of the inner end of an actuating lever 71. This lever extends out through a slot 72 in the front wall of the stand, outwardly of which it is provided with a finger piece 73. A stationary finger piece 74 is shown as secured to the front face of the stand so that the operator by engaging the finger pieces 73 and 74 and pressing them together may retract the movable anvil so as to permit the ready insertion or removal of a work piece between the anvils. Any suitable stop may be provided for limiting the closing movement of the anvil 15 with corresponding movement of the lever 71. A stop screw 75 threaded through the handle 71 and impinging upon a fixed stop 76 on the inner face of the stand is shown for this purpose.

It is desirable that the gauge be normally pressed toward closed position and in order to relieve the reed pivots from any biasing action in this direction, a coil spring 78 having one end hooked through the perforation of a boss 79 on the hand lever and the other end hooked through a perforated pin 80 in the right hand side wall of the stand has been illustrated. By engaging this spring with the hand lever all bending moment on the lever 13 is avoided. It is only necessary then for the operator, after the gauge has been adjusted for the particular work piece, to open the gauge by pressing the finger pieces 73 and 74 toward each other, whereupon he may insert the work piece to be gauged between the gauging elements and in proper relation to any locating surface with which the work piece may be provided, a corresponding work holder having been attached to the mounting spring. By releasing the finger portion 73 the gauge anvils are closed against the work, whereupon by rotating the work piece for a portion of a turn and observing any fluctuations of the needle 65, it may be readily ascertained by the operator whether or not the gauge dimension of the work piece remains within the tolerance limits during this rotation. Fluctuations in the position of the needle as the work piece is turned show out of roundness of the piece.

In Figure 2 the anvils are shown as provided with few threads, but where lead errors are also to be included as factors in the measurement of tolerances, the anvils may be made longer axially and be provided with more thread elements as shown, for example, in Figures 5 and 6. Lead errors will then have the effect, as the work is rotated, of crowding the movable anvil away from the fixed anvil, so that such errors also are determining factors in the gauging. While such lead inaccuracies are not indicated as such, they do enter into the final determination of whether or not a tested work piece is within the tolerance limits as shown by the pointer position and fluctuations during the turning of the work piece.

In order to facilitate the insertion or removal of work between the anvils, provision may be made in the mechanism shown herein for automatically freeing the work piece from the fixed anvil when the gauge is open. This is illustrated in Figures 2 and 4. Referring to these figures, the lever 13 which carries the movable anvil, is shown as provided with a pin 85 which projects into a slot 86 in the guiding stem 28. This slot is so proportioned with respect to the pin that as the lever 13 is swung away from the work piece sufficient to free the movable anvil therefrom, this pin strikes the outer wall of the slot 86 so that further opening motion of the lever 13 picks up the guide stem 28 and moves it, together with the spring 29 and the work piece, in the same direction, away from the fixed anvil 34, thus freeing the threads of the work piece from the threads of the fixed anvil. A similar pin 88 depending from the fixed block 31 and engaging in a slot 89 in the stem 28 acts as a stop to limit the separating movement of the stem 28, and through the connection of this stem 28 with the lever 13, also limits the extent of opening movement of the gauge. Thus it is only necessary for the operator, in opening the gauge, to press the lever 71 back as far as it will go, to insure sufficient opening of the gauge for the removal of the tested work and its replacement with another piece to be tested. This fault of opening motion is shown, for example, in Figure 4 wherein the outer broken line x represents the maximum diameter of the threaded portion of the work.

Figure 8:
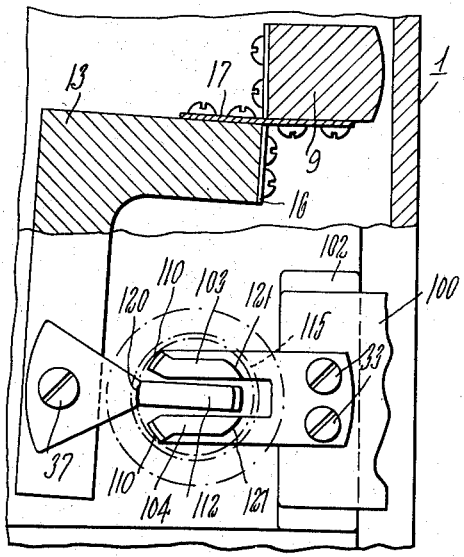
Figure 8 is a fragmentary view similar to a portion of Figure 7, but showing the gauge open.
Figure 9:
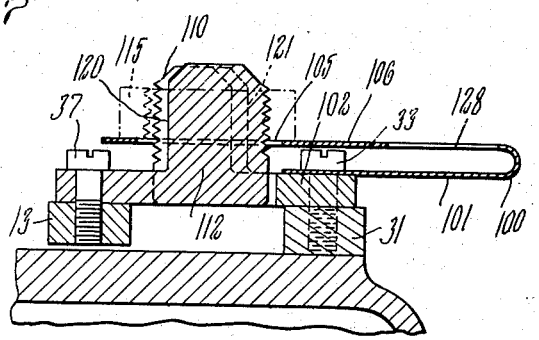
Figure 9 is a detail sectional view on line 9—9 of Figure 7.

In Figures 7 to 9, a gauge for internal threads is shown. In these figures, the spring 29 has been replaced by a U shaped leaf spring 100, the lower and shorter branch 101 of which is secured to the top face of the fixed gauging anvil 102 by the screws 33 by which this anvil may be secured to the fixed block 31. No depression 25 in the top face of the stand is required for the internal gauge. The fixed anvil comprises a pair of spaced arms 103 and 104, which are upwardly extended through an opening 105 through the upper arm 106 of the spring 100 and are provided at their extremities with the work engaging thread elements 110. The movable anvil has a single arm 112 which extends between the arms 103 and 104 of the fixed anvil and also extends upwardly through the hole 105. This movable element is also secured, as by the single screw 37, to the top face of the lever 13 so that it may have the same facility of adjustment as has the single anvil of the external gauge hereinbefore described when a master work piece is placed in gauging position and the gauge parts adjusted thereto. With this arrangement for the internal gauge it will be noted that the thread elements of the anvils are moved away from each other rather than toward each other in a gauging action, though this is done by the same direction of motion of the lever 13, as is the case in the gauges employed to gauge external threads. The work piece to be gauged, indicated at 115, is supported on the upper face of the spring arm 106, being permitted by reason of this spring arm to adjust itself axially so as to properly mate its threads with the gauging thread points of the anvils.

Here again it is also desirable that when the gauge is opened to free the work, the work be moved out of engaging relation with the fixed anvil. To this end, the rear end of the upstanding arm 112 of the movable anvil is provided with a smooth faced portion 120 which engages with the inner face of the work at the points of the threads, so that on further retraction it moves the work piece along the spring arm 100 out of contact with the gauging portions 110 of the fixed anvil shortly after the gauging points of the arm 112 have been retracted from the work threads at the other side of the work piece. Also for ease in positioning the work pieces, the rear ends of the upstanding arms 103 and 104 may likewise be provided with smooth faces 121, which, when the gauge is open, form with the smooth portion 120 a smooth pilot of slightly smaller external diameter than the minimum internal diameter of the work piece threads. Further, in order that the opening movement may not extend to a point where the interior of the work piece is gripped between the faces 120 of the movable anvil and the faces 121 of the fixed anvil, an adjustable stop limiting the opening motion of the hand lever 71 may be provided. As shown this comprises a stop screw 125 threaded through the hand lever 71 and butting against a suitable portion such as the finger stop 74. Either of the work supporting springs, 29 for externally threaded work and 101 for internally threaded work, may be provided with perforations such as 128 to increase the flexibility of the spring in various portions of its length as may be found desirable in any particular case to facilitate the proper presentation of the work pieces to the gauging anvils.

Where circumferentially grooved other than threaded work is to be gauged, the gauge points of the anvils will be shaped in accordance to the contours of the groove or grooves where the gauging action is desired.

From the foregoing description of certain embodiments of this invention, it should be evident to those skilled in the art that various changes and modifications might be made without departing from its spirit or scope.

I claim:

1. A gauge comprising a stand having a socket in its top face, a leaf spring extending across said socket and supported at opposite sides on said stand, gauging anvils, one of said anvils being fixed to said stand adjacent to said spring and having a work-engaging portion extending over said spring in position to engage a work piece supported by said spring, means movably supporting another of said anvils for engagement with the work piece angularly spaced from said one anvil, and means for indicating the position of said other anvil during a gauging operation.

2. A gauge comprising a stand provided with an apertured top face, a headed bracket having its head extending across said aperture and supported by said stand, and having a shank depending through said aperture, a lever having a shank depending adjacent to said bracket shank, pairs of leaf spring fulcrum elements joining said shanks, a movable work-engaging anvil carried by said lever to swing over said top face, a stationary anvil carried by said stand for cooperation with said movable anvil to gauge a work piece placed therebetween, and a yieldable support carried by said stand for carrying a work piece in gauging position between said anvils.

3. A gauge comprising a stand, a leaf spring supported by said stand and having a work piece supporting portion free to flex, an anvil fixed adjacent to said supporting portion in position to engage a work piece on said portion, a lever mounted to swing toward and from said supporting portion, an anvil member carried by said lever in position to engage said work piece on said portion, and a position indicator in operative relation to said lever when said lever-carried anvil member is in closed position in engagement with said work piece.

4. A gauge comprising a stand, a leaf spring supported by said stand with a portion free to flex, a work supporting member carried by said spring portion, an anvil fixed adjacent to said supporting portion in position to engage a work piece on said member, a lever mounted to swing toward and from said member, an anvil carried by said lever in position to engage said work piece on said member, and a position indicator in operative relation to said lever when said lever-carried anvil is in closed position in engagement with said work piece.

5. A gauge comprising a stand, a leaf spring supported by said stand and having a work piece supporting portion free to flex, an anvil fixed adjacent to said supporting portion in position to engage a work piece on said portion, a lever mounted to swing toward and from said supporting portion, an anvil member carried by said lever in position to engage said work piece on said portion, a position indicator in operative relation to said lever when said lever-carried anvil member is in closed position in engagement with said work piece, means normally pressing said lever in closing direction, and operator-actuated means for swinging said lever-mounted anvil member away from the work piece.

6. A gauge comprising a plurality of gauging anvils relatively movable to engage or be retracted from a work piece, means for supporting the work piece in gauging position, means for so relatively moving said anvils, said gauge including means responsive to the movement of one of said anvils out of gauging relation to the work to engage and move the work out of engagement with another of said anvils.

7. A gauge comprising a stand having a socket in its top face, a leaf spring extending across said socket and supported at opposite sides on said stand, cooperating guide portions carried by said spring and stand retaining said spring against relative motion in the direction of said supported sides, and relatively movable gauging anvils extending over said spring transverse to said direction for gauging a work piece placed between said anvils and supported by said spring.

8. A gauge comprising a stand having a socket in its top face, a leaf spring extending across said socket and supported at opposite sides on said stand, a stem extending downwardly from said spring, said stand having a guide slot through said top face transverse to the direction of said supported spring sides and through which said stem is slidably guided, thereby retaining said spring against relative motion in said direction, a gauging anvil fixed to said stand and extending above said spring transverse to said direction, and a gauging anvil mounted for motion toward and from said fixed anvil to gauge a work piece positioned between said anvils and supported by said spring, said stem being movable in said slot in said transverse direction to permit the work piece to be moved into and out of gauging relation to said fixed anvil.

9. A gauge comprising a stand having a socket in its top face, a leaf spring extending across said socket and supported at opposite sides on said stand, a stem extending downwardly from said spring, said stand having a guide slot through said top face transverse to the direction of said supported spring sides and through which said stem is slidably guided, thereby retaining said spring against relative motion in said direction, a gauging anvil fixed to said stand and extending above said spring transverse to said direction, a gauging anvil mounted for motion toward and from said fixed anvil to gauge a work piece positioned between said anvils and supported by said spring, said stem being movable in said slot in said transverse direction to permit the work piece to be moved into and out of gauging relation to said fixed anvil, and a work holder having a face for engagement with a locating face of said work piece and having means for supporting said work holder on said spring and stem.

10. A thread gauge comprising a stand having a socket in its top face, a leaf spring extending across said socket and supported at opposite sides on said stand, cooperating guide portions carried by said spring and stand retaining said spring against relative motion in the direction of said supported sides, a gauging anvil fixed to said stand and extending above said spring transverse to said direction, a gauging anvil movable toward and from said fixed anvil transverse to said direction, said anvils having gauging thread points for contact with threads of a work piece supported by said spring between said anvils, said spring being free for motion transverse to said direction to facilitate corresponding motion of the work piece into and out of gauging relation to said fixed anvil, and indicating means responsive to the gauging position of said movable anvil.

11. A gauge comprising a plurality of gauging anvils for engagement with a threaded work piece, means for supporting the work piece in gauging position, means for moving one of said anvils to and from gauging position, and means responsive to the movement of one anvil from gauging position to engage and move said supporting means to disengage the work piece from another of said anvils.

12. An internal thread gauge comprising a plurality of internal gauging anvils mounted for relative motion to gauging position and relative motion in the opposite direction out of gauging position, one of said anvils having a part remote from its gauging face positioned to engage the points of the work threads when said anvils are moved relatively out of gauging relation and free the work piece from another of said anvils for free removal and replacement of said work piece.

13. An internal thread gauge comprising a plurality of internal gauging anvils mounted for relative motion to gauging position and relative motion in the opposite direction out of gauging position, one of said anvils having a part remote from its gauging face positioned to engage the points of the work threads when said anvils are moved relatively out of gauging relation and free the work piece from another of said anvils for free removal and replacement of said work piece, and means for limiting such relative movement of said anvils in said opposite direction short of gripping relation between said anvils and the work.

14. A thread gauge comprising a stand, a support for a work piece to be gauged carried by said stand, a stationary gauging anvil carried by said stand at one side of said support, a gauging anvil on the other side of said support mounted for movement from and toward said stationary anvil to gauge or release a work piece on said support, means for so moving said movable anvil, means for indicating the position of said movable anvil when in gauging position, and a lost motion connection between said movable anvil and said support causing release motion of said movable anvil to a predetermined extent to move said support away from said fixed anvil sufficiently to free the threads of a work piece carried by said support from said fixed anvil.

15. An internal thread gauge comprising a stand, a leaf spring supported by said stand and having a perforated arm for supporting a work piece, a pair of gauging anvils extending through said perforation to engage internal threads on a work piece supported on said spring, said anvils being relatively movable to engage and retract from said threads, means for indicating the relative work-engaging positions of said anvils, and means for so relatively moving said anvils, one of said anvils having an unthreaded rear face for engagement with the points of the work threads when said anvils are retracted to move the work piece out of engagement with the gauging faces of the other of said anvils and thereby free the work piece for removal and replacement.

16. An internal thread gauge comprising a stand, a leaf spring supported by said stand and having a perforated arm for supporting a work piece, a pair of gauging anvils extending through said perforation to engage internal threads on a work piece supported on said spring, said anvils being relatively movable to engage and retract from said threads, means for indicating the relative work-engaging positions of said anvils, means for so relatively moving said anvils, one of said anvils having an unthreaded rear face for engagement with the points of the work threads when said anvils are retracted to move the work piece out of engagement with the gauging faces of the other of said anvils and thereby free the work piece for removal and replacement, and means for limiting said relative retracting motion to an extent to prevent clamping of the work piece between the rear faces of said anvils.

17. An internal thread gauge comprising a stand, a pair of internal thread gauging anvils relatively movable to gauge or release work carried by said stand, one of said anvils having a pair of spaced arms terminating at their outer ends in gauging points, and the other of said anvils having a single arm movable between said spaced arms and terminating in gauging points for engaging the work spaced at large angles from the points of said one anvil, said anvils having unthreaded rear portions engageable with the thread points of the work when said gauging points are retracted from the work, means for indicating the relative positions of said anvils when in gauging positions, and means for relatively moving said anvils between gauging and retracted positions.

18. An internal thread gauge comprising a stand, a pair of internal thread gauging anvils relatively movable to gauge or release work carried by said stand, one of said anvils having a pair of spaced arms terminating at their outer ends in gauging points, and the other of said anvils having a single arm movable between said spaced arms and terminating in gauging points for engaging the work spaced at large angles from the points of said one anvil, said anvils having unthreaded rear portions engageable with the thread points of the work when said gauging points are retracted from the work, means for indicating the relative positions of said anvils when in gauging position, means for relatively moving said anvils between gauging and retracted positions, and means for limiting the extent of said anvil retracting motion sufficiently to prevent said rear portions from exerting clamping engagement with the work.

19. An internal gauge comprising a stand, a U shapel leaf spring having a relatively short lower arm secured to said stand and a relatively long upper arm extending over and in spaced relation to said stand, said long arm having an opening therethrough, a pair of gauging anvils extending upwardly through said opening, one of said anvils being fixed to said stand, and the other of said anvils being movably mounted on said stand for gauging and retraction with respect to an internal work piece supported on said upper arm and in operative relation to said fixed anvil, means for moving said movable anvil to gauge or release the work piece, and means for indicating the position of said movable anvil when both anvils are in gauging relation to the work piece on said upper arm.

20. A gauge comprising a plurality of gauging anvils for engagement with a work piece, means for supporting the work piece in gauging position, and means for moving one of said anvils to and from gauging position, said movable anvil having a work gauging portion and a portion for engagement with the work when said movable anvil is moved in a direction to separate said work gauging portion from the work and to move the work out of engagement with another of said anvils on continued retraction of said movable anvil from gauging position.

WILLIS F. MOORE.